United States Patent
Mikola et al.

(10) Patent No.: US 6,862,450 B2
(45) Date of Patent: Mar. 1, 2005

(54) RESETTING SIGNALING LINK UPON SRNS RELOCATION PROCEDURE

(75) Inventors: Juha Mikola, Helsinki (FI); Sinikka Sarkkinen, Kangasala (FI)

(73) Assignee: Nokia Mobile Phones Ltd., Espoo (FI)

( * ) Notice: Subject to any disclaimer, the term of this patent is extended or adjusted under 35 U.S.C. 154(b) by 789 days.

(21) Appl. No.: 09/778,670

(22) Filed: Feb. 7, 2001

(65) Prior Publication Data

US 2002/0107019 A1 Aug. 8, 2002

(51) Int. Cl.[7] ................................................. H04Q 7/20
(52) U.S. Cl. ..................... 455/438; 455/437; 455/439; 455/560; 370/331
(58) Field of Search ..................... 455/436, 437, 455/438, 439, 440, 442, 517, 560; 370/331, 332

(56) References Cited

U.S. PATENT DOCUMENTS

| | | | | |
|---|---|---|---|---|
| 5,790,528 A | * | 8/1998 | Muszynski | 370/331 |
| 5,850,607 A | | 12/1998 | Muszynski | 455/442 |
| 6,230,013 B1 | * | 5/2001 | Wallentin et al. | 455/436 |
| 6,590,905 B1 | * | 7/2003 | Suumäki et al. | 370/466 |
| 6,661,782 B1 | * | 12/2003 | Mustajärvi et al. | 370/331 |
| 2001/0018345 A1 | * | 8/2001 | Longoni et al. | 455/436 |
| 2001/0034228 A1 | * | 10/2001 | Lehtovirta et al. | 455/560 |
| 2001/0046863 A1 | * | 11/2001 | Rinne et al. | 455/442 |
| 2002/0107019 A1 | * | 8/2002 | Mikola et al. | 455/436 |

FOREIGN PATENT DOCUMENTS

| | | | | |
|---|---|---|---|---|
| WO | 99/51051 | * | 10/1999 | H04Q/7/38 |
| WO | 00/31988 | * | 6/2000 | H04Q/7/00 |

OTHER PUBLICATIONS

3G TS 25.322 v 3.3.0 (Jun. 2000); 3rd Generation Parthership Project; Technical Specification Group Radio Access Network; RLC Protocol Specification (Release 1999).

"UMTS:Interlayer Procedures in Connected Mode (3G TS 25.303 v.3.6.0 Release 1999)", ETSI Tls 125 303 v3.6.0, XX, XX, Dec. 2000, pp. 60–65.

"UMTS: RLC Protocol Specification (3G TS 25.322 v 3.5.0 Release 1999)", ETSI TS 125 v 3.5.0, XX, XX, Dec. 2000, pp. 33–47.

"UMTS: RLC Protocol Specification (3G TS 25.331) v 3.5.0 Release 1999)", ETSI TS 125 331 v3.5.0, XX, XX, Dec. 2000, pp. 98–128.

* cited by examiner

*Primary Examiner*—Rafael Perez-Gutierrez

(57) ABSTRACT

Reset of one or more state variables of a User Equipment (UE) RLC layer is carried out by signaling reset from a radio link control layer of a source radio network controller (RNC) to a radio link control layer of the UE during a seamless control relocation procedure in which a possible loss of synchronization and consequent disruption in communication between the UE and a target RNC is avoided.

15 Claims, 8 Drawing Sheets

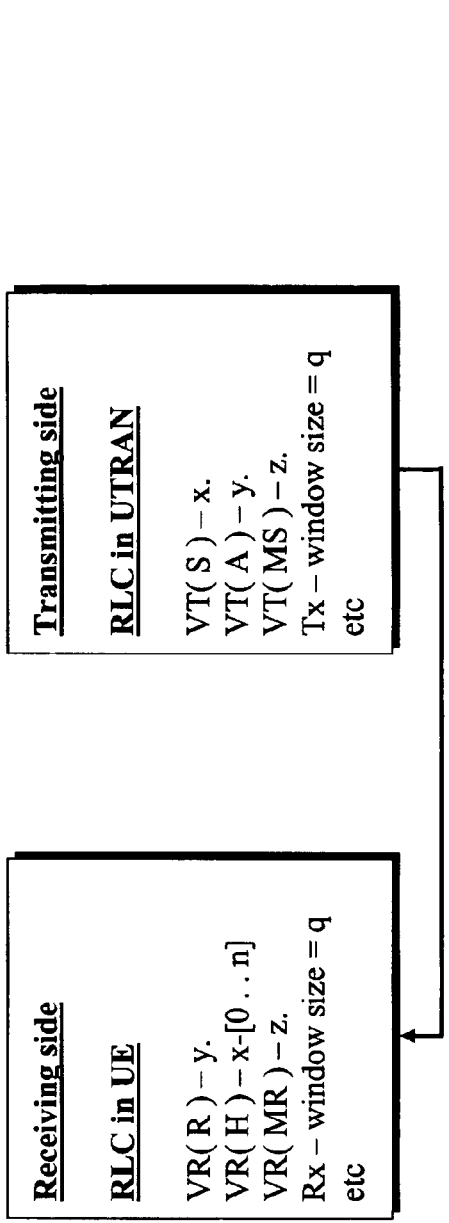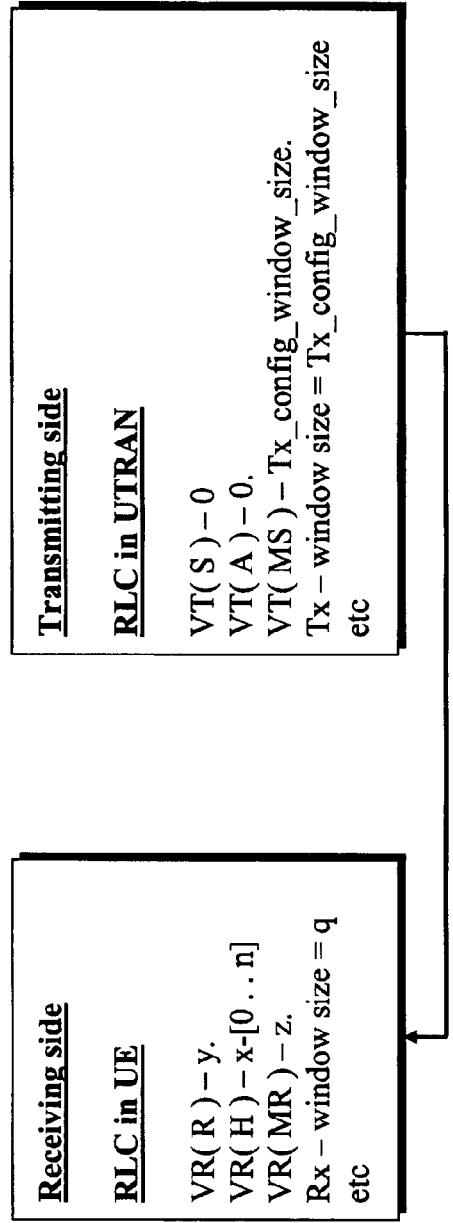
FIG. 5A
PRIOR ART
FIG. 5B
PRIOR ART

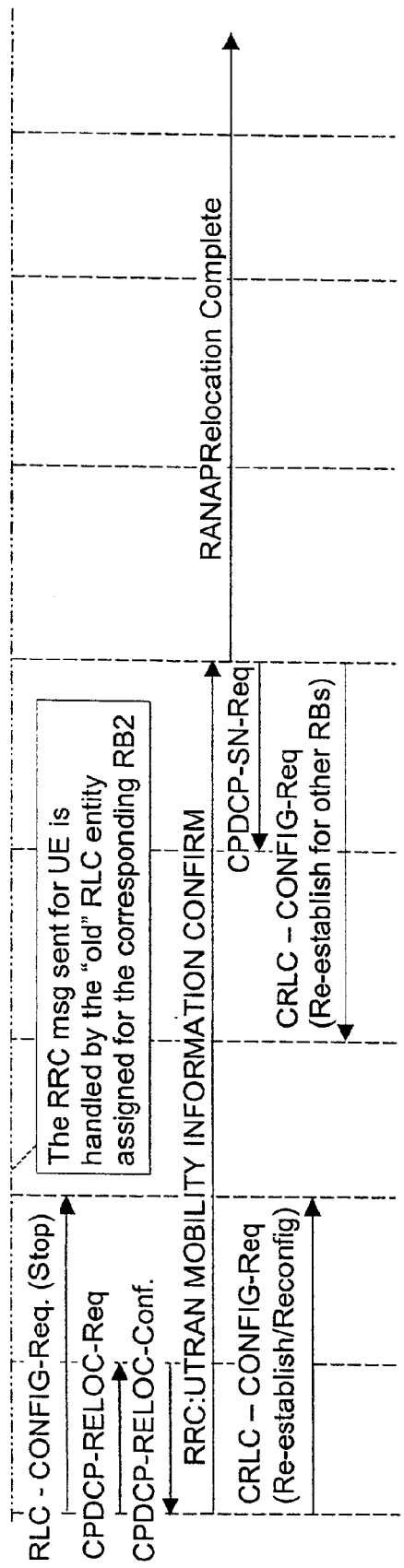
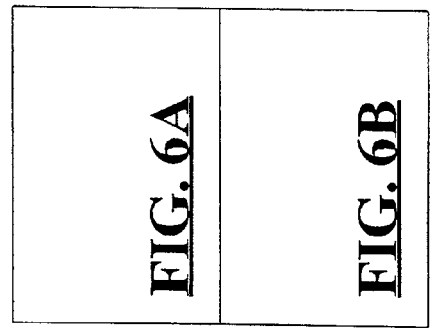
FIG. 6B
(PRIOR ART)
FIG. 6
(PRIOR ART)

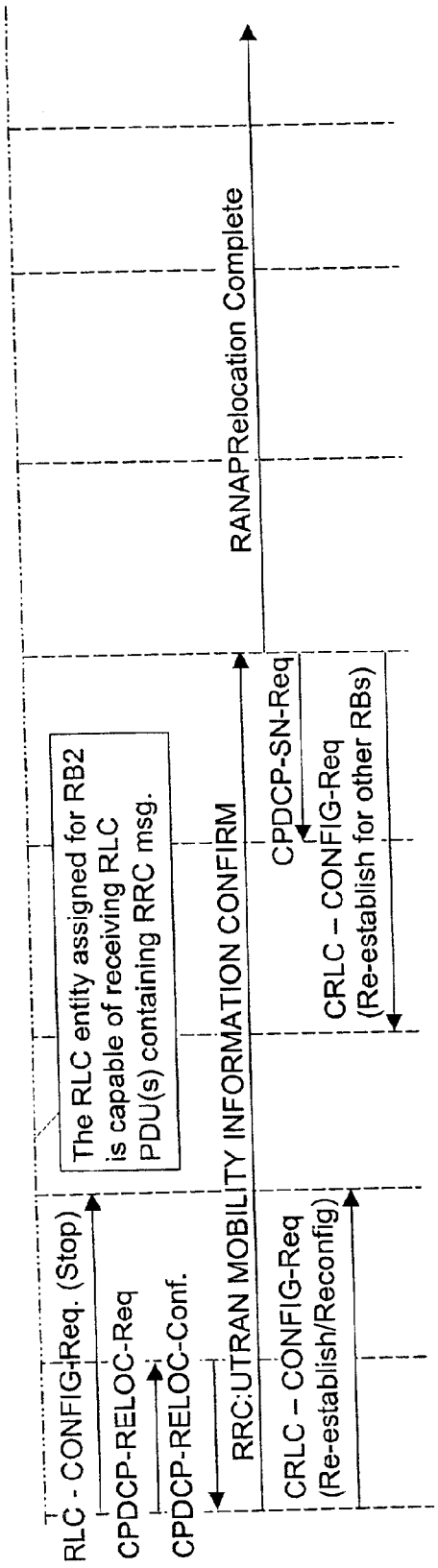
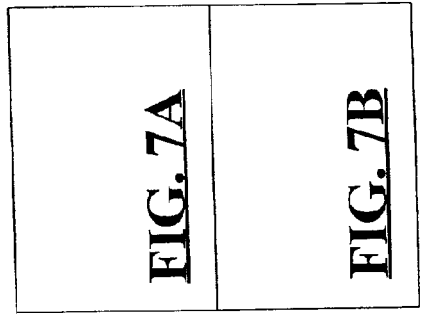
FIG. 7B
FIG. 7

RESETTING SIGNALING LINK UPON SRNS RELOCATION PROCEDURE

BACKGROUND OF THE INVENTION

1. Technical Field

The present invention relates to mobile telecommunications and, more particularly, to an operational state in which a user equipment (UE) simultaneously has radio links with two or more radio access network (RAN) access points.

2. Discussion of Related Art

In the third generation partnership project (3GPP), to support mobility in the Universal Terrestrial Radio Access Network (UTRAN) a Serving Radio Network Subsystem (SRNS) relocation procedure has been defined by 3GPP Technical Specification Group (TSG) Radio Access Network (RAN) Working Group 3 (WG3). With the aid of this procedure the UTRAN can transfer the active Radio Resource Control (RRC) connection from one Radio Network Controller (RNC) (Source RNC) to another (Target RNC).

The triggering of the SRNS relocation procedure is dependent on the mobility of the UE. If the UE camps on a cell that is not controlled by the current Serving RNC the UE should send either a Cell or User Registration Area (URA) update message (which one is dependent on the network configuration). Based on this message the RNC may trigger the SRNS relocation procedure, which means that the RRC connection will be changed from this RNC (Source RNC) to the new RNC (Target RNC). The target RNC will after the successful SRNS relocation act as a new Serving RNC. During the SRNS relocation procedure all necessary signalling information and all user plane data will be transferred to the target RNC, to enable the target RNC to establish the same radio bearers (RBs) in the target RNC as were used in the source RNC and to ensure that the new Serving RNC can continue the data transmission from any service data unit (SDU), which has not yet been acknowledged by the UE.

The radio bearer re-establishment in the target RNC concerns both signalling plane and user plane RBs. For each RB the new Serving RNC should allocate such layer 2 (L2) resources (i.e., for Medium Access Control (MAC) and Radio Link Control (RLC) entities), which are as identical as possible with the resources in the old Serving RNC. The re-establishment is always made by using the received configuration parameters from the old Serving RNC. These parameters identify the characteristics of each RB; however, they do not identify the transmission phase that was used in the old SRNC (i.e., the current values of state variables, counters etc.). The target RNC cannot replicate the transmission phase completely in the Target RNC; however it can—because of L2 re-establishment—reset all UTRAN state variables and configuration parameters to their initial values. The most critical layer in this case is the RLC layer, which contains several status variables, configuration variables, timers and counters which are all increased/decreased upon active data transmission based, e.g., on the amount of data sent from the RLC layer and received status reports from the peer RLC entity. Therefore it is very important to achieve synchronization between the peer RLC entities before any data (signalling or user data) is sent either upon or after the SRNS relocation procedure. FIG. 5A shows an example of the RLC variables before initialization of the SRNS relocation where the variables are defined in 3G TS 25.322 at Section 9.4 ("State Variables") as follows:

VT(S)—Send state variable—The sequence number of the next PU to be transmitted for the first time (i.e., excluding retransmission). It is updated after transmission of a PDU, which includes not earlier transmitted PUs and after transmission of a MRW SUFI. The initial value of this variable is 0.

VT(A)—Acknowledge state variable—The sequence number of the next in-sequence PU expected to be acknowledged, which forms the lower edge of the window of acceptable acknowledgements. The initial value of this variable is 0.

VT(MS)—Maximum Send state variable—The sequence number of the first PU not allowed by the peer receiver [i.e., the receiver will allow up to VT(MS)−1], VT(MS)=VT(A)+Tx_Window_Size. This value represents the upper edge of the transmit window. The transmitter shall not transmit a new PU if VT(S) VT(MS). VT(MS) is updated based on receipt of a STATUS PDU including an ACK and/or a WINDOW super-field.

VR(R)—Receive State variable—Receive State variable—The sequence number of the next in-sequence PU expected to be received. It is set equal to SNmax+1 upon receipt of the next in-sequence PU, where SNmax is the sequence number of the highest received in-sequence PU. The initial value of this variable is 0.

VR(H)—Highest expected state variable—The sequence number of the highest expected PU. This state variable is set equal to SN+1 only when a new PU is received with VR(MR)>SN$\geq$VR(H). The initial value of this variable is 0.

VR(MR)—Maximum acceptable Receive state variable—The sequence number of the first PU not allowed by the receiver [i.e., the receiver will allow up to VR(MR)−1], VR(MR)=VR(R)+Rx_Window_Size. The receiver shall discard PUs with SN$\geq$VR(MR).

FIG. 5B shows an example of the RLC variables after the reestablishment of the RLC entity in the target RNC. As can be seen by comparing FIG. 5A with 5B, the transmitting side can have its VT variables reset. This creates a difference between the RLC variables in the transmitting side (VT) and the receiving side (VR).

The situation is very critical if the synchronization is lost between such RLC entities, which are used for the transmission of the first RRC message, which informs the UE about the SRNS relocation that has occurred. If this message does not pass the RLC layer in the UE, because of the RLC synchronization problems, the SRNS relocation cannot be successful, and the worst case is that the whole RRC connection must be released with the consequent disruption of the exchange of control of the communication link. The RLC level synchronization must be maintained for the signalling RB (RB 2), which is used upon transmission of the first RRC message from UTRAN to UE. (Note: Depending on the network configuration the RRC message in question can be sent by using either the unacknowledged RLC entity=RB 1 or acknowledged RLC entity=RB 2 (see TSG RAN TS 25.331). In this specification the case where RB 2 is used is discussed at length).

Since it is impossible to predict beforehand the need for an SRNS relocation, it is also impossible to make any advance arrangements on L2 in the SRNC to support any forthcoming SRNS relocation procedure. This means that some form of re-synchronization of L2 is needed during or after the SRNS relocation.

The 3GPP TS 25.322 RLC specification defines for the RLC layer the RLC Reset procedure, which is used when the RLC detects an unrecoverable protocol error on the RLC layer. The RLC entity triggers the RLC reset in order to recover from an error situation and to resynchronize the peer RLC entities. This is done by resetting the state variables to their initial value and resetting the configurable parameters to their configured value on both peer RLC entities. After a successful RLC reset, the RLC entity can continue the interrupted data transmission. According to the current TSG RAN TS 25.322 RLC specification the RLC Reset procedure is initialized only when the RLC entity detects an error situation.

DISCLOSURE OF INVENTION

An object of the present invention is to avoid loss of synchronization upon SRNS relocation.

This is achieved, according to the present invention, by requiring synchronization of the peer RLC entities during SRNS relocation.

Another object of the present invention is to use the RLC reset procedure to accomplish synchronization of the peer RLC entities during SRNS relocation.

According to the present invention, an RLC reset is performed during the SRNS relocation to assure RLC synchronization between the network (NW) and the UE. Hence the purpose of the RLC Reset procedure is expanded in this invention. In this invention the RLC Reset is used even if no protocol error has been detected by the RLC entity.

This invention is needed mainly between RLC peer entities operating in acknowledge mode on the signalling radio bearer (RB 2) which is used for the transmission of the first RRC message from the Target RNC to the UE. The invention can also be used on other RLC entities assigned for other RBs, but the use in these cases is not mandatory.

The idea of the invention is to reset the peer RLC entities by the Source RNC. After the SRNS relocation preparation phase the RRC in the Source RNC sends a CRLC Config.req primitive (including a reset request to the RLC entity). After the RLC reset procedure the UE RLC is able to receive the first RRC message (containing a new U-RNTI (UTRAN Radio Network Temporary Identity) from the Target RNC.

In the prior art procedure, since no RLC reset was performed in the UE RLC before the new serving RNC sent the first RRC message, it could be that the UE RLC might not have accepted the received RLC PDUs (containing the RRC message), as these RLC PDUs are typically outside of the receiving window.

In normal operation (i.e., no errors on the air interface) this invention advantageously provides for no additional delays to the SRNS relocation procedure. Moreover, the SRNS relocation can be interrupted in an early phase, e.g., if the UE cannot be reset.

The present invention is manifested in various aspects including a method, a user equipment, a mobile telecommunications system, and a radio network controller. Thus, according to a first aspect of the present invention, a method for use in a mobile telecommunications system with radio network controllers capable of exchanging control of a communication link to a user equipment without disruption comprises the steps of (1) deciding at a source radio network controller to perform relocation of control of the communication link to a target radio network controller, (2) preparing at the target radio network controller for the relocation, (3) providing a reset signal from the source radio network controller to the user equipment, (4) resetting at least one state variable of the user equipment, and (5) relocating the control of the communication link from the source radio network controller to the target radio network controller. The second step of preparing the target radio network controller for the relocation may, for instance, include initializing or resetting one or more state variables of the target radio network controller. The state variables of the target radio network controller may, for instance, include a receive state variable, a highest expected state variable, or a maximum acceptable receive state variable. The at least one state variable of the user equipment reset in the fourth step may, for instance, be a send state variable, an acknowledge state variable or a maximum send state variable. The method may be used in an acknowledge mode.

According to a second aspect of the present invention, a user equipment is provided for use in a mobile telecommunications system with radio network controllers capable of exchanging control of a communication link to the user equipment without disruption comprises (1) means responsive to a reset signal from a source radio network controller for resetting at least one state variable of the user equipment, and (2) means responsive to the reset signal from the source radio network controller for providing a reset acknowledge signal to the source radio network controller. The state variable of the user equipment may, for instance, be a send state variable, an acknowledge state variable, or a maximum send state variable. The user equipment may practice the invention in an acknowledge mode.

According to a third aspect of the present invention, a mobile telecommunications system with radio network controllers capable of exchanging control of a communication link to a user equipment without disruption comprises (1) means for deciding at a source radio network controller to perform relocation of the control of the communication link to a target radio network controller, (2) means for preparing at the target radio network controller for the relocation, (3) means for providing a reset signal from the source radio network controller to the user equipment, (4) means responsive to the reset signal for resetting state variables of the user equipment, and (5) means for relocating the control of the communication link from the source radio network controller to the target radio network controller. The means for preparing may include means for initializing or resetting one or more state variables of the target radio network controller. The state variables of the target radio network controller may, for instance, include a receive state variable, a highest expected state variable and a maximum acceptable receive state variable. The state variable of the user equipment may, for instance, include a send state variable, an acknowledge state variable or a maximum send state variable. The system may be used in an acknowledge mode.

According to a fourth aspect of the present invention, a radio network controller for use in a mobile telecommunications system with plural radio network controllers capable of exchanging roles in controlling a communication link over an air interface to a user equipment without disruption comprises (1) means for deciding to perform relocation of control of the communication link to a target radio network controller and for providing a reset signal to the user equipment, and (2) means responsive to a reset acknowledge signal from the user equipment for signaling commitment of the source radio network controller to the relocation to the target radio network controller.

According to a fifth aspect of the present invention, a radio network controller for use in a mobile telecommunications system with plural radio network controllers capable of exchanging roles in controlling a communication link over an air interface to a user equipment without disruption comprises (1) means responsive to a relocation decision signal from a source radio network controller for initializing or resetting one or more state variables of the radio network controller acting as a target radio network controller, and (2)

means for controlling the user equipment with the radio network controller acting as the target radio network controller with the user equipment having state variables reset to match the one or more state variables of the radio network controller.

These and other objects, features and advantages of the present invention will become more apparent in light of the detailed description of a best mode embodiment thereof, as illustrated in the accompanying drawings.

BRIEF DESCRIPTION OF THE DRAWING

FIG. 5A and FIG. 5B together show an RLC status variable example from the prior art, without the RLC reset of the present invention, where FIG. 5A shows the RLC variables for the example before initialization of the SRNS relocation and FIG. 5B shows the RLC variables after the reestablishment of the RLC entity in the target RNC.

BEST MODE FOR CARRYING OUT THE INVENTION

Figure 1:
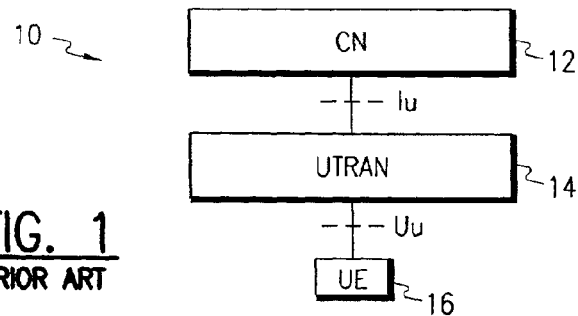
FIG. 1 shows the overall architecture of the Universal Mobile Telecommunications System (UMTS).

FIG. 1 shows a simplified Universal Mobile Telecommunication System (UMTS) 10, including a Core Network (CN) 12, a UMTS Terrestrial Radio Access Network (UTRAN) 14, and a User Equipment (UE) 16. The CN 12 is connected to the UTRAN 14 by an Iu interconnection point, which is also considered a reference point. The UTRAN 14 is connected to the UE 16 by a Uu interconnection point, which is likewise considered as a reference point. The protocols over Uu and Iu interfaces are divided into two structures, i.e., user plane and control plane protocols. User plane protocols implement the actual radio access bearer servers for carrying user data through the access stratum. Control plane protocols control the radio access bearers and the connection between the UE and the network from different aspects (including requesting a service, controlling different transmission resources, handover and streamlining, etc.).

Figure 2:
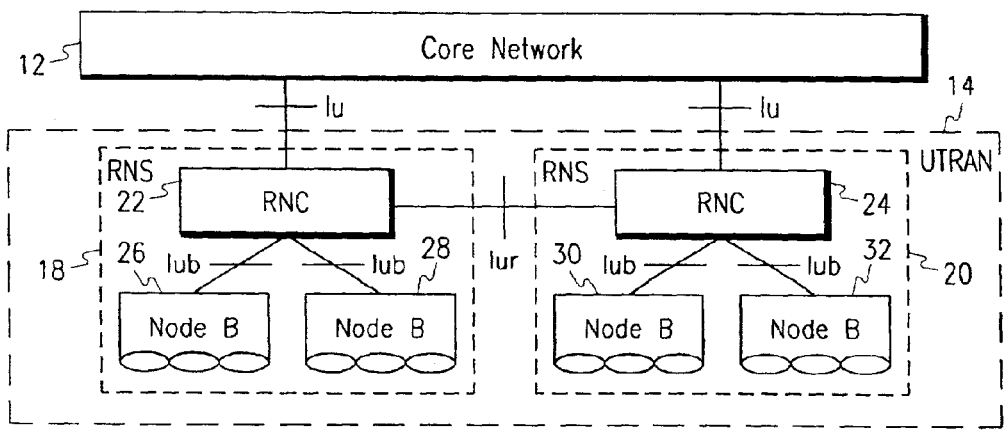
FIG. 2 shows details of the UTRAN connected to the core network.

As shown in FIG. 2, the UTRAN consists of a set of Radio Network Subsystems (RNSs) 18, 20 connected to the core network 12 through the Iu. A RNS consists of a Radio Network Controller (RNC) 22, 24 and one or more abstract entities currently called Node B 26, 28, 30, 32. The node Bs are connected to the RNC through the Iub interface.

Figure 3:
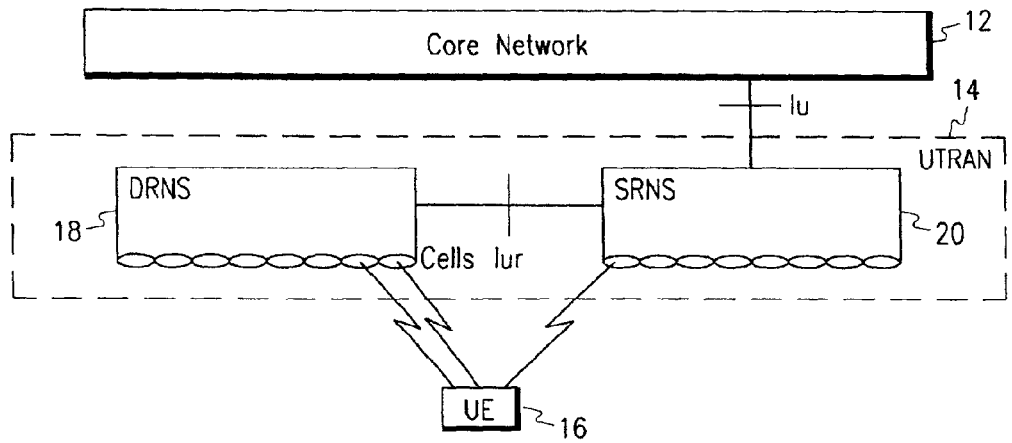
FIG. 3 shows a user equipment connected to both a serving and a drift RNS.

A Node B can support frequency division duplexing (FDD) mode, time division duplexing (TDD) mode or dual-mode operation. The RNC is responsible for the handover decisions that require signaling to the UE. It comprises a combining/splitting function to support macrodiversity between different Node Bs. Inside the UTRAN, the RNCs of the radio network subsystems can be interconnected together through an Iur interface. At the bottom of each Node B in FIG. 2 are shown a plurality of cells, for which each corresponding Node B is responsible. For each connection between a user equipment and the UTRAN, one RNS is the serving RNS. When required, drift RNSs support the serving RNS by providing radio resources, as shown in FIG. 3. The rollover RNS (serving or drift) is on a per connection basis between a UE and the UTRAN, as also shown in FIG. 3.

Figure 4:
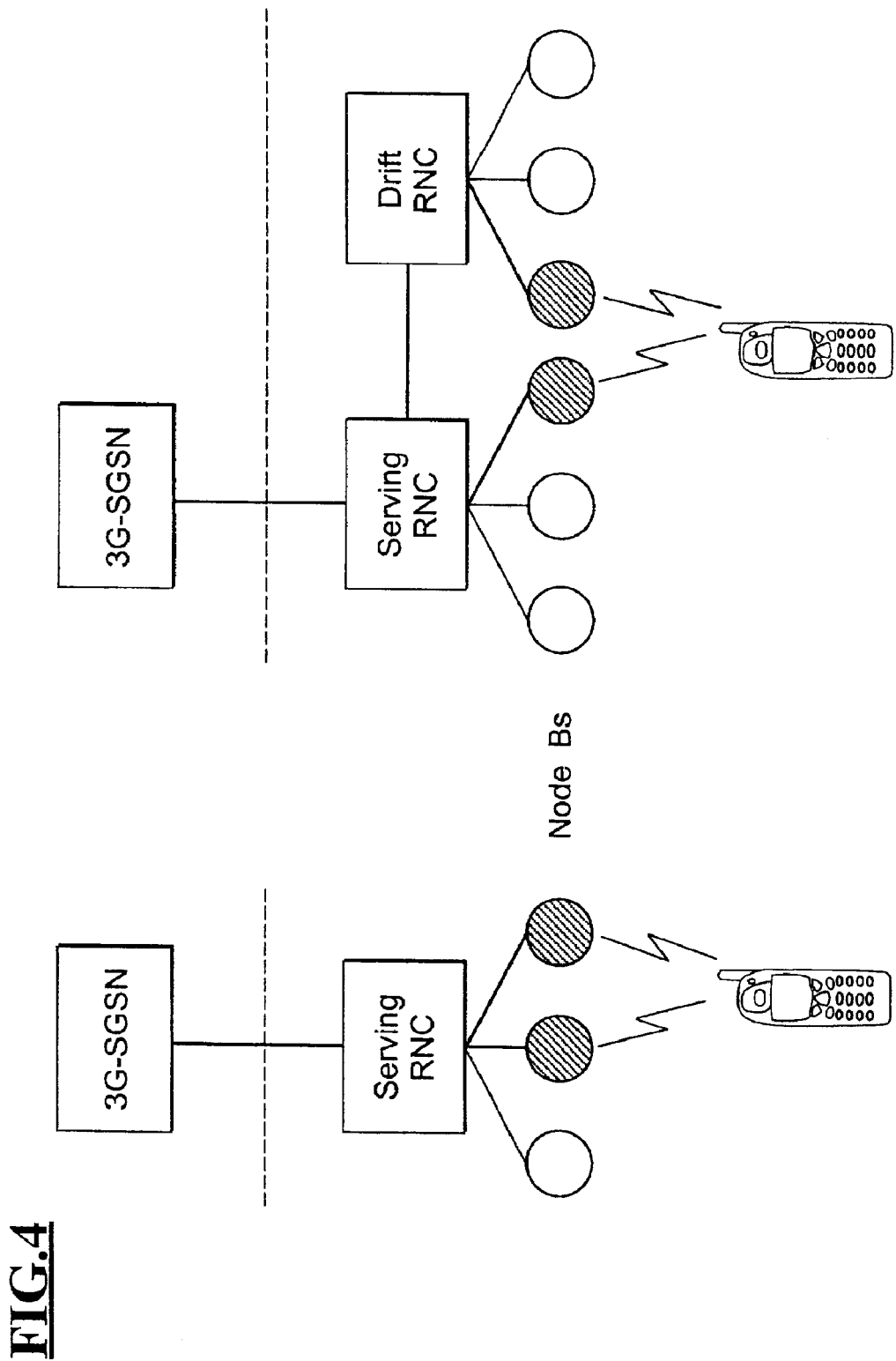
FIG. 4 also shows two logical RNCs with the DRNC only used to relay information between the UE and the SRNC.

The UMTS introduces a new concept called macrodiversity. In a macrodiversity situation, data will be sent via multiple node Bs. Because signals will be transferred via multiple routes over the air interface and combined in the UE and RNC, e.g., the fading effect will be less harmful, and thus lower power levels can be used. However, those node Bs may belong to the area of two or more different RNCs, so the interface, i.e., the Iur-interface between RNCs is required. In this situation, as shown in FIG. 4, the RNC can be in two logical roles. The RNC can be logically either a "drift" RNC (DRNC) or a "serving" (SRNC). The actual termination point of the Iu-interface will be SRNC, as shown for both logical possibilities in FIG. 4. The Iu-interface will connect the radio access network (RAN) and core network (CN), whether it be packet- or circuit-switched. SRNC will control information transfer and request radio resources from appropriate DRNCs. The DRNC will only relay information between the UE and SRNC, which is depicted in FIG. 4. Cell level mobility issues will be handled within UTRAN. When there exists a dedicated connection to the user equipment, the UTRAN will handle the radio interface mobility of the UE. This includes procedures such as soft handover.

It will be understood therefore that for the new macrodiversity concept for 3G, it will be possible to set up multiple radio links simultaneously between a user equipment in order to be in a position to decide which of the wireless links from a plurality of base stations is preferred at any given point in time during a communications session and to switch seamlessly between the radio links during the session depending on which link is preferred. A switch to a base station with a stronger signal can be made without having to set up a new connection. This is noteworthy and distinguished from the hard handovers of the prior art. However, there is a potential problem with such a switchover that has not been addressed.

FIG. 5A shows an example of the prior art situation of the RLC variables before initialization of the SRNS relocation. On the transmitting side, at the RLC layer in UTRAN, the state variable VT(S) defines the next sequence number of the RLC PDU, which is going to be submitted to the receiver for the first time. This variable value is comparable with the receiver VR(H). The state variable VT(A) identifies the RLC PDU, which is expected to be acknowledged next. This value reflects the variable values of VR(R) and possible VR(H) at the receiver side. The VT(MS) identifies the upper edge of the transmission window and the Tx_window_size the size of the transmission window.

On the receiving side, as shown in FIG. 5A at the RLC layer in the UE, the RLC state variables are shown the following state variable values; VR(R), VR(H) and VR(MR). VR(R) identifies the sequence number of the next in-sequence PU expected to be received. I.e., in the presented example the transmitter has transmitted the RLC PDU with SN-y (which is also the lowest RLC PDU SN to be acknowledged). At the receiver side this same RLC PDU SN is considered as a lowest RLC PDU SN which is expected to be received. VR(H) defines the sequence number of the highest expected PU, which means that the receiver may have receive RLC PDUs with SN between VR(A) and VR(H)-1, and therefore this value follows the trend of VT(S) in the short term. The VR(MR) describes the sequence number of the first PU not allowed by the receiver, i.e., it identifies the highest edge of the receiver window and therefore it is dependent on the value of Rx_window_size and the value of VR(R). As a conclusion, it can be said that the RLC PDU transmission impacts the state variables on both ends and therefore they are at some level dependent on the phase of the RLC PDU transmission.

In FIG. 5B, an example shown of the prior art RLC variables after the reestablishment of the RLC entity in the target RNC. As can be seen on the right hand side of FIG. 5B for the transmitting side, at the RLC layer in UTRAN, the state variables have been reset. But, on the receiving side at the RLC layer in the UE, the values of the state variables are the same as they were before (as shown in FIG. 5A). In this situation loss of synchronization occurs because the RLC PDUs that are sent are outside of the receiving window.

Figure 6A:
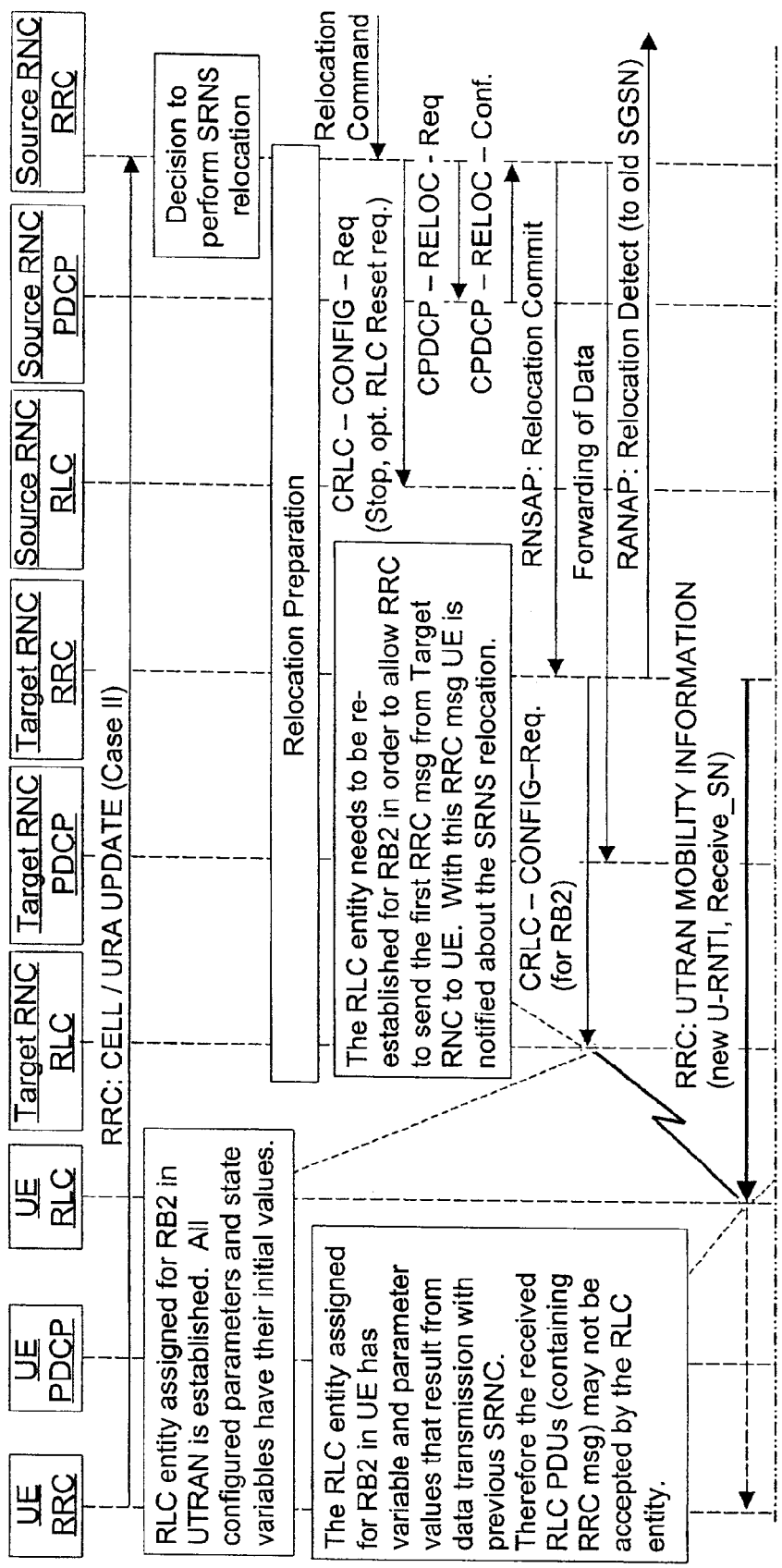
FIG. 6 shows how FIGS. 6A and 6B fit together and which together show that no reset of the RLC entities has been made in the UE before the transmission of the RRC: UTRAN MOBILITY INFORMATION msg, according to the prior art.

FIGS. 6A and 6B together show a sequence of SRNS relocation which might give rise to the situation as shown in FIGS. 5A and 5B. FIG. 6 shows how FIGS. 6A and 6B fit together. After receiving a RRC cell/URA update from the UE RRC, a decision to perform SRNS relocation may be made at the RRC layer of the source RNC. Relocation preparation then commences and is completed as shown. In the relocation preparation phase the resources are reserved in the target RNC. When the resources have been reserved, the old SGSN sends a relocation command to the source RNC which, in response thereto, provides a CRLC-CONFIG-Req primitive to the RLC layer of the source RNC. This primitive is used by RRC to establish, release or reconfigure the RLC. For purposes not relevant for this invention CPDCP-RELOC-Req and CPDCP-RELOC-Conf primitives are then exchanged between the RRC and PDCP layers of the source RNC. After that, a RNSAP relocation commit signal is provided from the RRC layer of the source RNC to the RRC layer of the target RNC over the Iur interface. The CRLC-CONFIG-Req primitive is then provided from the target RNC RRC layer to the RLC layer thereof. As indicated, the RLC entity at the target RNC needs to be reestablished for RB2 in order to allow RRC to send the first RRC message from the target RNC to the UE. With this RRC message, the UE is notified about the SRNS relocation. At this point, the RLC entity assigned for RB2 in the UTRAN is established. All configured parameters and state variables have their initial values as shown on the right hand side of FIG. 5B. The problem is that the RLC entity assigned for RB2 in the UE has the variable and parameter values that resulted from data transmission with the previous SRNC as shown at the left hand side of FIG. 5B. Therefore, the received RLC PDUs (containing RRC message) may not be accepted by the RLC entity. Because the RRC message sent for the UE RLC is handled by the "old" RLC entity assigned for the corresponding RB2, there could be a problem and the change to the target RNC could be unsuccessful.

Figure 7A:
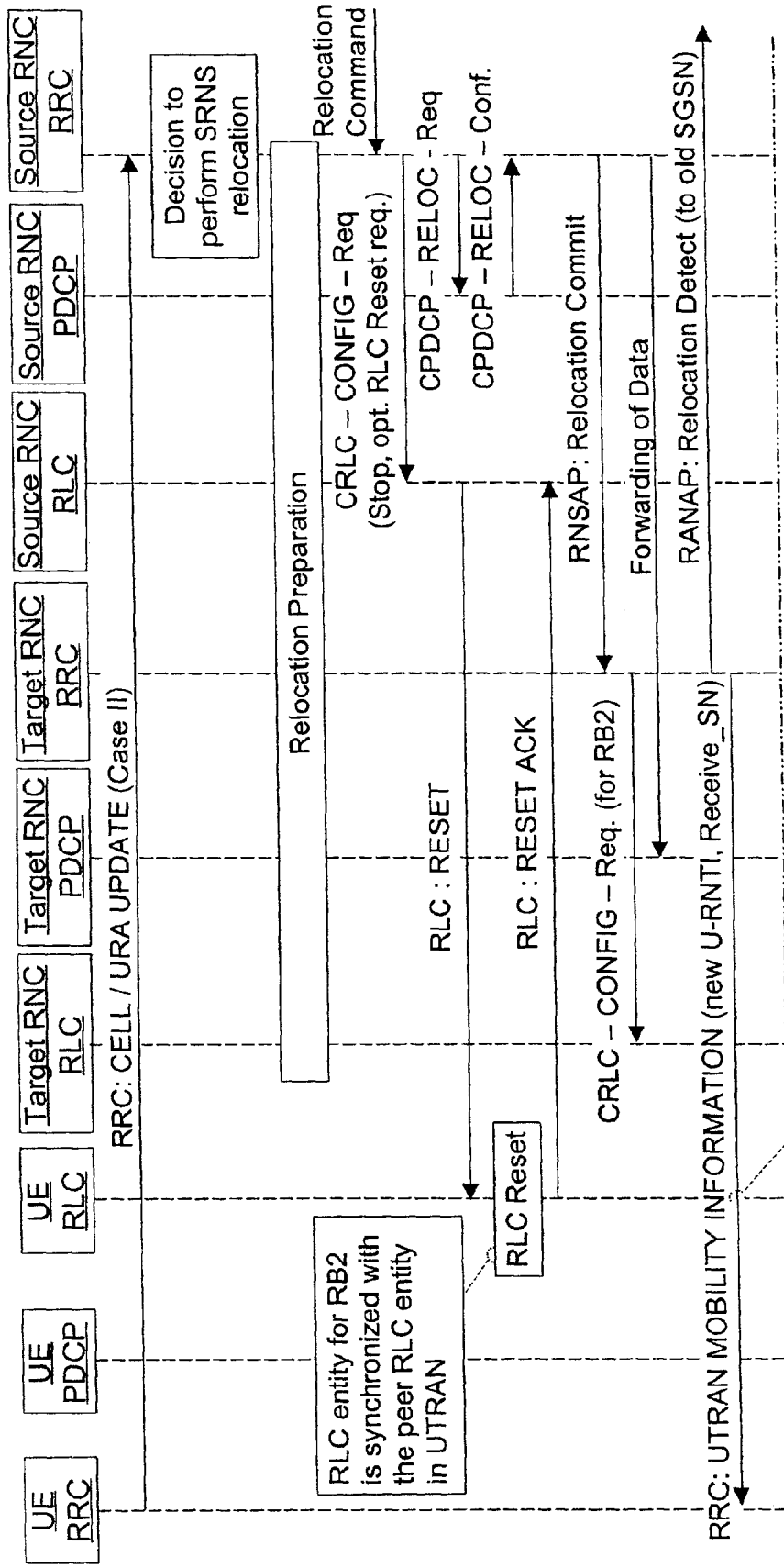
FIG. 7 shows how FIGS. 7A and 7B fit together and which together show that reset of the RLC entities has been made in the UE before the transmission of the RRC: UTRAN MOBILITY INFORMATION msg, according to the present invention.

Referring now to FIG. 7, it shows how FIGS. 7A and 7B fit together. According to the present invention, as shown in FIGS. 7A and 7B, after the CRLC-CONFIG-Req primitive is sent from the source RNC RRC to the source RNC RLC, an RLC reset signal is sent from the RLC layer at the source RNC to the RLC layer at the UE. This causes the RLC entity assigned for RB2 to be synchronized with the peer RLC entity in the UTRAN by virtue of the fact that the RLC parameters are reset before the transmission of the RRC UTRAN mobility information message. At that point, the RLC entity assigned for RB2 is capable of receiving RLC PDUs containing the RRC message.

An RLC reset acknowledge is then sent from the RLC layer of the UE to the RLC layer of the source RNC. An RNSAP relocation commit signal is then sent from the source RNC RRC layer to the RRC layer of the target RNC. From there, a CRLC-CONFIG-Req. primitive is sent to the RLC layer of the target RNC. Data is then forwarded from the RRC layer of the source RNC to the PDCP layer of the target RNC. The RRC layer of the target RNC sends back an RANAP relocation detect signal to the old SGSN and a UTRAN mobility information signal to the RRC layer of the UE. This indicates the RLC entity assigned for RB2 is capable of receiving RLC PDUs containing RRC msg as shown in FIGS. 7A and 7B. This is distinguished from the prior art shown in FIGS. 6A and 6B for the RRC MSG sent for the UE is handled by the "old" RLC entity assigned for the corresponding RB2. In other words, instead of the RLC entity assigned for RB2 in the UE having variable and parameter values resulting from data transmission with the previous SRNC, the RLC entity assigned for RB2 in the UE has now been reset and is fully capable of receiving RLC PDUs containing the RRC msg. Once the new U-RNTI and Receive_SN is received by the RRC layer of the UE, it sends an RLC-Config-Req signal to the RLC layer. CPDCP-Reloc primitives Req and Conf are then interchanged between the UE RRC and PDCP whereafter the RRC layer in the UE sends a UTRAN mobility information confirm signal to the RRC layer of the target RNC. After that, an RANAP relocation complete signal is sent from the RRC layer of the target RNC upstream followed by a CPDCP-SN-Req signal to the PDCP layer and a CRLC-CONFIG Req to the RLC layer. At about the same time, a CRLC-CONFIG-Req signal is sent from the RRC layer of the UE to the RLC layer thereof. These last steps are the same as would have occurred in the prior art if the RLC PDUs from the target RNC were accepted by the UE.

Figure 8:
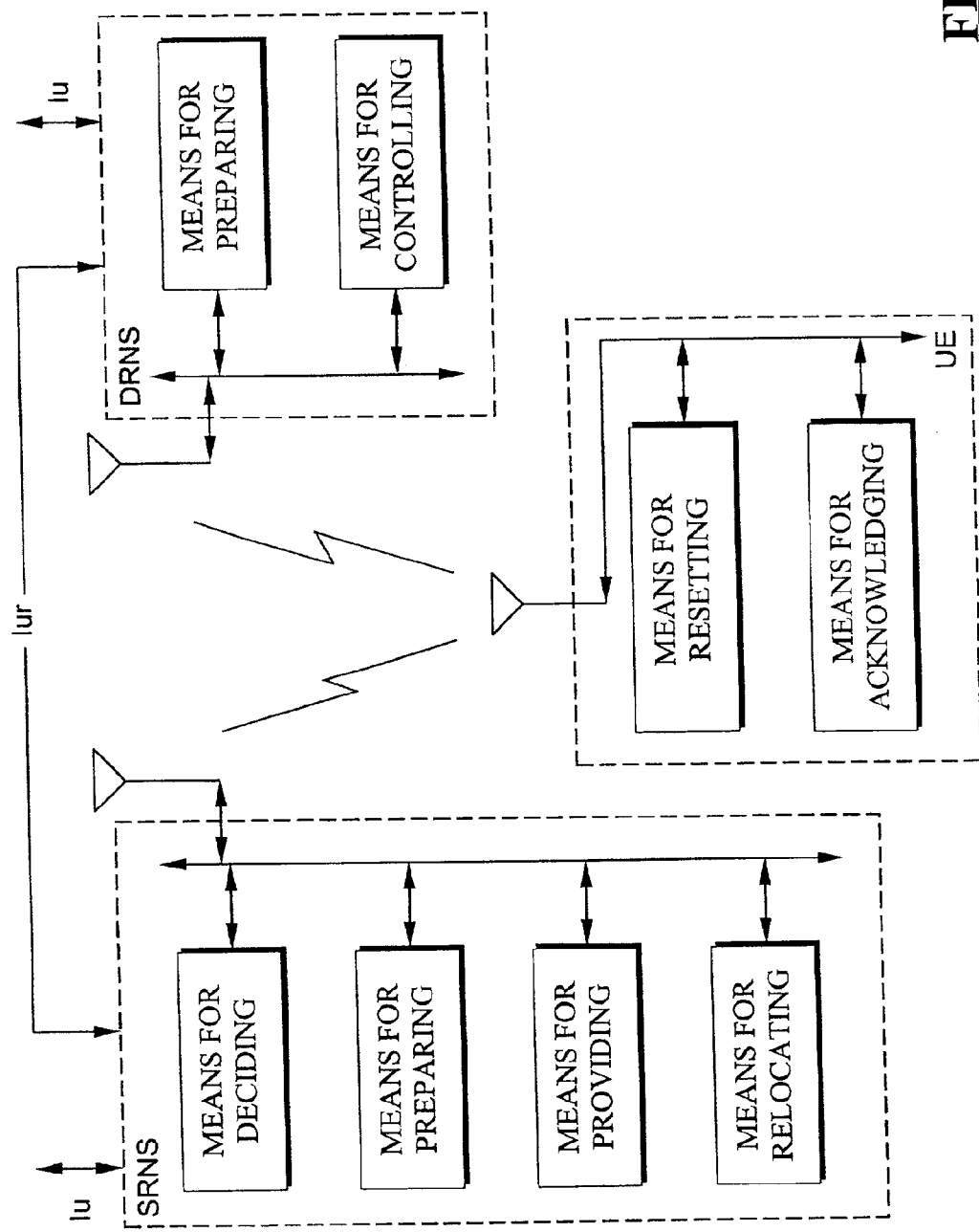
FIG. 8 shows a mobile telecommunication system with radio network controllers capable of exchanging control of a communication link to a user equipment without disruption, according to the present invention.

FIG. 8 shows a mobile telecommunication system with radio network controllers SRNS, DRNS capable of exchanging control of a communication link to a user equipment UE without disruption. Although the radio network controllers of FIG. 8 are illustrated in specific roles of serving and drift radio network subsystems, it should be realized that a given radio network subsystem should be capable of operating either as a serving or drift radio network subsystem. In that case, the functional block shown in the SRNS of FIG. 8 will also be included in the DRNS of FIG. 8. Likewise, the partial blocks shown in the DRNS of FIG. 8 will be included in the SRNS, although only one role will be performed at a given moment with respect to a particular communication link. The SRNS of FIG. 8 has means for deciding to perform relocation of the control of the communication link to the target radio network controller DRNS as also shown in FIGS. 6A and 6B and 7A and 7B. The DRNS will have means for preparing for the relocation as illustrated in FIGS. 6A and 6B and 7A and 7B. This may constitute means for resetting one or more state variables of the DRNS. Such preparations may be carried out in conjunction with the SRNS and therefore the SRNS is also shown with means for preparing for the relocation. The SRNS of FIG. 8 is also shown with means for providing a reset signal from the SRNS to the user equipment UE over the air interface. The user equipment UE is shown having means responsive to the reset signal from the SRNS for resetting one or more state variables of the user equipment. The user equipment may acknowledge the reset as shown in FIGS. 7A and 7B and therefore means for acknowledging is shown within the UE of FIG. 8. Once acknowledged, a relocation commit signal may be provided by the SRNS to the DRNS over the Iur interface as also shown in FIGS. 7A and 7B. This can be considered as being carried out by means for relocating the control of the communication link from the source radio network controller SRNS to the target radio network controller DRNS. Of course, the other steps shown in FIGS. 7A and 7B after the RNSAP relocation commit will also be carried out to complete relocation. After that, the DRNS will control the communication link by means of the illustrated means for controlling the user equipment.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A mobile telecommunications system with radio network controllers capable of exchanging control of a communication link to a user equipment without disruption, comprising:

means for deciding at a source radio network controller to perform relocation of said control of said communication link to a target radio network controller;

means for preparing at said target radio network controller for said relocation;

means for providing a reset signal from said source radio network controller to said user equipment;

means responsive to said reset signal for resetting state variables of said user equipment; and means for relocating said control of said communication link from said source radio network controller to said target radio network controller.

2. The system of claim 1, wherein said means for preparing includes means for initializing or resetting one or more state variables of said target radio network controller.

3. The system of claim 2, wherein said one or more state variables of said target radio network controller include at least one state variable selected from the group consisting of a receive state variable, a highest expected state variable, and a maximum acceptable receive state variable.

4. The system of claim 3, wherein said at least one state variable of said user equipment includes at least one state variable selected from the group consisting of a send state variable, an acknowledge state variable and a maximum send state variable.

5. The system of claim 1, for use in an acknowledge mode.

6. Method for use in a mobile telecommunication system with radio network controllers capable of exchanging control of a communication link to a user equipment without disruption, comprising the steps of:

deciding at a source radio network controller to perform relocation of said control of said communication link to a target radio network controller, preparing at said target radio network controller for said relocation, providing a reset signal from said source radio network controller to said user equipment, resetting at least one state variable of said user equipment, and relocating said control of said communication link from said source radio network controller to said target radio network controller.

7. The method of claim 6, wherein said step of preparing includes initializing or resetting one or more state variables of said target radio network controller.

8. The method of claim 7, wherein said one or more state variables of said target radio network controller include at least one state variable selected from the group consisting of a receive state variable, a highest expected state variable, and a maximum acceptable receive state variable.

9. The method of claim 8, wherein said at least one state variable of said user equipment includes at least one state variable selected from the group consisting of a send state variable, an acknowledge state variable and a maximum send state variable.

10. The method of claim 6, for use in an acknowledge mode.

11. Radio network controller for use in a mobile telecommunications system with plural radio network controllers capable of exchanging roles in controlling a communication link over an air interface to a user equipment without disruption, comprising:

means responsive to a relocation decision signal from a source radio network controller for initializing or resetting one or more state variables of said radio network controller acting as a target radio network controller; and means for controlling said user equipment with said radio network controller acting as said target radio network controller with said user equipment having state variables reset by said source radio network controller to match said one or more state variables of said target radio network controller.

12. Radio network controller for use in a mobile telecommunications system with plural radio network controllers capable of exchanging roles in controlling a communication link over an air interface to a user equipment without disruption, comprising:

means for deciding to perform relocation of control of said communication link to a target radio network controller and for providing a reset signal to said user equipment; and means responsive to a reset acknowledge signal from said user equipment for signaling commitment of said source radio network controller to said relocation to said target radio network controller.

13. User equipment for use in a mobile telecommunications system with radio network controllers capable of exchanging control of a communication link to said user equipment without disruption, comprising:

means responsive to a reset signal from a source radio network controller for resetting at least one state variable of said user equipment; and means responsive to said reset signal from said source radio network controller for providing a reset acknowledge signal to said source radio network controller.

14. The user equipment of claim 13, wherein said at least one state variable of said user equipment includes at least one state variable selected from the group consisting of a send state variable, an acknowledge state variable and a maximum send state variable.

15. The user equipment of claim 13, for use in an acknowledge mode.

* * * * *